United States Patent [19]

Kunert

[11] Patent Number: 4,477,507
[45] Date of Patent: Oct. 16, 1984

[54] GLASS PANE FITTED WITH A VARIABLE PROFILE FRAME

[76] Inventor: Heinz Kunert, Am Krieler Dom 23, 5000 Köln 41, Fed. Rep. of Germany

[21] Appl. No.: 411,234

[22] Filed: Aug. 25, 1982

[30] Foreign Application Priority Data

Aug. 31, 1981 [DE] Fed. Rep. of Germany ....... 3134340

[51] Int. Cl.³ .......................... E06B 7/23; E06B 7/232
[52] U.S. Cl. ..................................... 428/188; 428/122; 428/138; 428/358; 428/192; 49/491; 49/498; 52/400; 52/403; 52/716
[58] Field of Search ...................... 428/122, 188, 138; 49/490, 462, 491, 498; 52/716, 400, 403

[56] References Cited

U.S. PATENT DOCUMENTS

| | | | |
|---|---|---|---|
| 3,728,832 | 4/1973 | Erck | 52/400 |
| 4,103,459 | 8/1978 | Barnerias et al. | 49/491 |
| 4,304,816 | 12/1981 | Bright et al. | 49/491 X |

Primary Examiner—Alexander Thomas
Attorney, Agent, or Firm—Kerkam, Stowell, Kondracki & Clarke

[57] ABSTRACT

A shaped molding (13), placed on the edge of a glass pane (2), has a segment (17) which, viewed in cross section, lies outside the periphery of the glass pane (2) and which can be subjected to controlled plastic deformation through the action of mechanical forces. In this way, a framed glass pane can be made with calibrated outside dimensions. Because of the controlled plastic deformation, surface tolerances, e.g., the manufacturing tolerances of the window openings of automobile bodies, can be compensated for individually.

16 Claims, 9 Drawing Figures

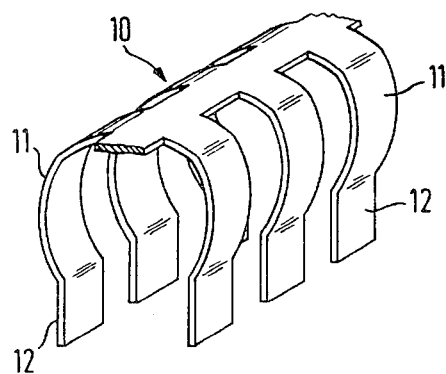
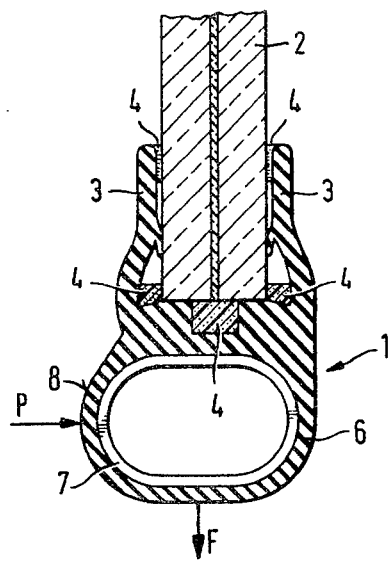
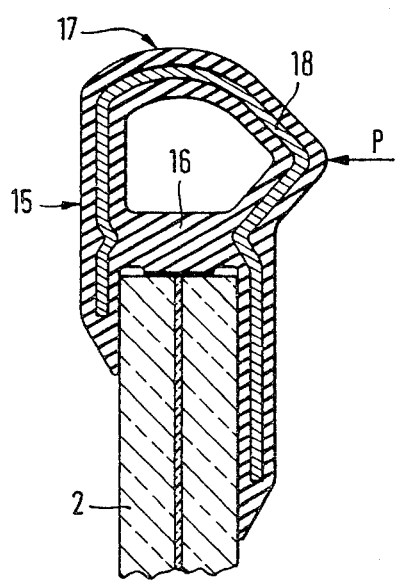
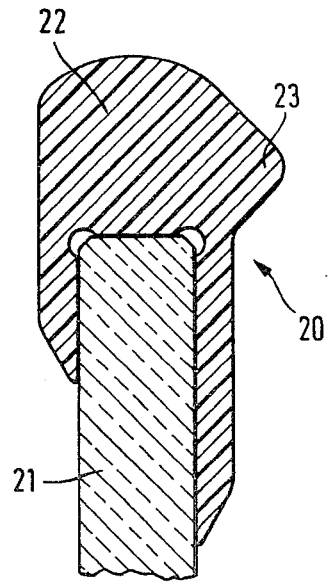

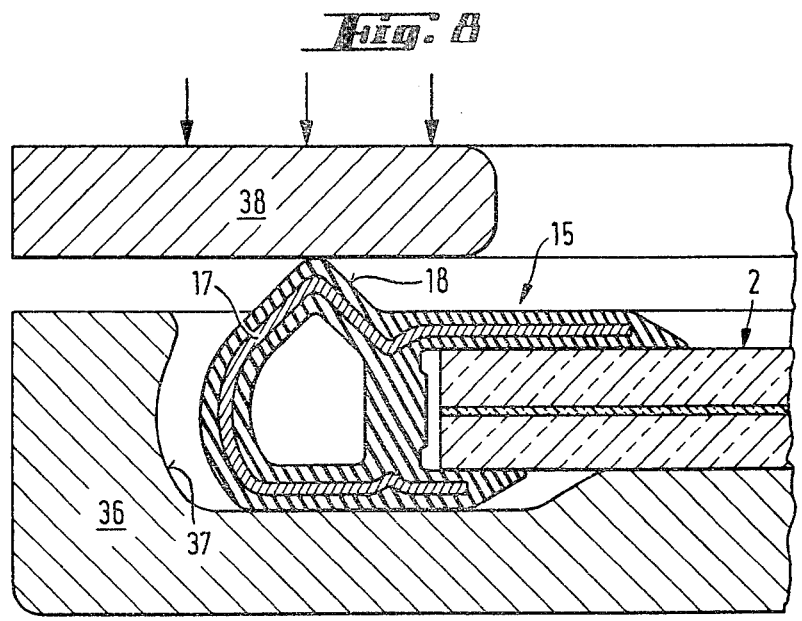
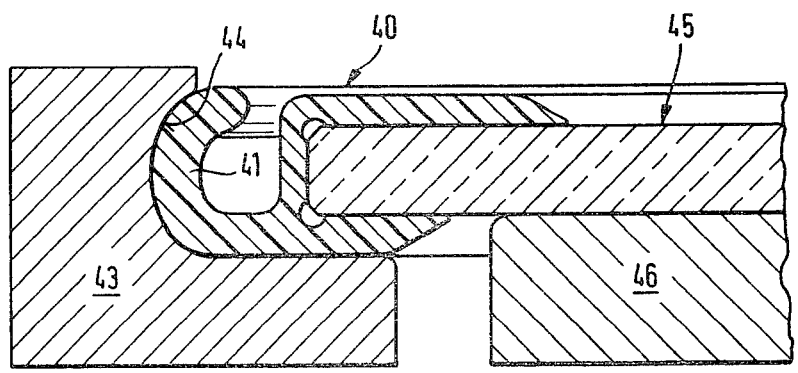

GLASS PANE FITTED WITH A VARIABLE PROFILE FRAME

This invention relates to a glass pane fitted with a shaped molding, more particularly an automobile glass pane designed to be cemented into the frame of a window opening of an automobile body.

There is an increasing interest to firmly cement glass panes, especially windshield and rear windows, into automobile bodies. In order to cement the glass panes, a bead or strand of adhesive, preferably a permanently flexible adhesive and caulk are applied in the window frame of the auto body or onto the inner surface of the glass pane along its peripheral edge, and the glass pane is set into the window frame and pushed against the flange of the frame. Since the window frame is larger than the glass pane, spacers are also required around the circumference of the glass pane to maintain the same spacing on all sides between the edge of the glass pane and the edge of the pertinent window frame. Support elements are needed, especially along the bottom edge of the glass pane to prevent the glass pane from slipping under its weight prior to the complete curing of the adhesive. Further, in order to conceal the layer of adhesive, which is generally applied non-uniformly, either a non-transparent layer of paint or enamel is applied to the glass pane along its circumference, or a decorative trim or cover strip is applied subsequently from the outside.

Another disadvantage of glueing the glass panes into window frames is that, as a rule, the dimensional tolerances, especially of the window openings of the auto body, result in disturbances.

Therefore, it is an object of this invention to create a glass pane especially suited for cementing into the window frame of a car body, whose outside dimensions can be changed subsequently, within certain limits, according to the dimensional tolerances of the window frame and/or the glass pane. In certain cases, the glass pane should have the required spacing and support components needed for the installation into the window frame.

Starting with a glass pane fitted with a shaped molding, the invention is characterized in that the molding, in cross-sectional view, has a segment outside the periphery of the glass pane which, after the molding has been mounted, can be subjected to controlled plastic deformation through the action of mechanical forces.

The plastically deformable segment of the shaped molding can consist, at least in part, of a metallic hollow body which, for instance, may be a "U" or "O" shaped sectional strand or a skeleton-like, slotted, bent-over sheet metal strip. Alternatively, it may consist of a thermoplastic material and can be developed as a solid or a hollow section.

Advantageously, the glass panes according to the teachings of this invention are already fitted with the shaped molding at the glass pane factory. The shaped molding thus serves simultaneously as protection for the edges of the glass panes during further handling and transport. Prior to installation into the auto body opening, the outside dimensions of the framed glass panes are made to comply with the measurements required in each particular case. Thus, each single framed glass pane can, for example, be fitted individually to the dimensions of the window opening for which the glass pane is intended.

The necessary steps for complying with the dimensions can be applied even with a fully mechanized or fully automated assembly, where the actual values of the dimensions of the window opening are taken by a measuring tool on the assembly line and the frame-pressing tool is adjusted according to the actual values, so that the postpressed shaped molding is fitted exactly to the pertinent window frame. In this manner, all spacer and support components can be dispensed with, since the shaped molding with its segment which has been made to comply with the final dimensions required in each particular case is supported directly on the window frame flange. Furthermore, the shaped molding on the glass frame represents a form of protection, through which possible damage of the auto body finish as a result of contact with the panes is avoided. In addition, the danger of breakage of the glass panes is reduced, which is particularly important in the case of laminated glass made from thin single glass panes, and the laminated glass pane is given greater strength by the shaped molding.

The shaped molding can be pushed onto the edge of the pane over a "U"-shaped segment and fastened to the glass pane by its clamping action. To increase the clamping forces, the U-shaped part may have a springy insert, e.g., a skeleton-like insert consisting of a slotted sheet metal strip. However, the shaped molding may also be glued onto the edge of the glass pane.

Further features and advantages of the invention will become apparent from the subclaims and from the ensuing description of specific embodiments with reference to the accompanying drawings, wherein:

FIG. 1 shows a first specific embodiment of the glass pane framed in accordance with the invention in a section through the area at the edge of the glass pane;

FIG. 2 shows a metallic skeleton-like deformable insert for a shaped molding advocated by the invention;

FIG. 3 shows another embodiment of the shaped molding according to the invention;

FIG. 4 shows a specific embodiment of the shaped molding according to the invention with a plastically deformable solid segment;

FIG. 8 is a schematic representation of the pressing tool and the pressing process for enlarging the peripheral dimensions of a framed glass pane, and the molding section;

FIG. 9 is a schematic representation of the pressing tool and of the pressing process for reducing the peripheral dimensions of a framed glass pane;

Figure 6:
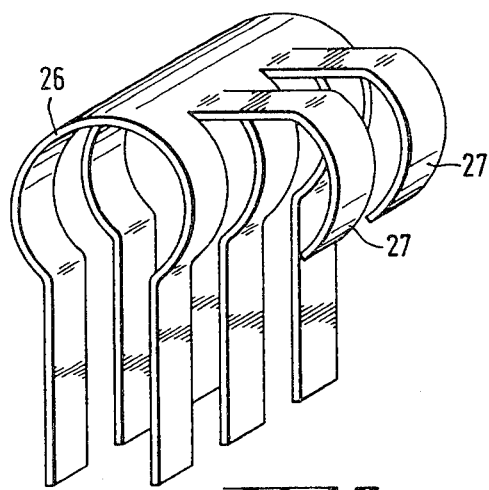
FIG. 6 shows the deformable reinforced insert used in the specific embodiment shown in FIG. 5.

In the specific embodiment shown in FIG. 1, a laminated glass pane 2 is surrounded on its periphery with a variable profile molding section 1. The molding section 1 has a U shape profile whose shank on legs 3 engages the rim or edge of the laminated glass on both sides. There is inserted between the sides of the glass 2 and the U shape legs 3 of the profile section 1 adhesive layers 4 which are provided for adhesion and sealing. A further adhesive layer or bead 4 may be provided between the edge of the laminated glass pane 2 and the inside surface of the molding section. To this end the inside surface may include a groove or channel which receives the adhesive as shown in FIG. 1. The molding section 3 consists of a flexible rubber-like material.

A hose-like or hollow tube segment 6, whose wall is reinforced with a skeleton-like oval shaped reinforcing insert 7, is located on the central fillet of the molding section on the side away from the glass pane 2. The reinforcing insert may also be a metal strip, e.g., of the type shown in a modified version in FIG. 2, embedded in the segment wall. The hose-like segment 6 is formed asymmetrically and forms a projecting bulge 8 n one side. In order to modify the outside dimensions of the framed glass pane, i.e. provide a variable profile, the bulge 8 is pushed in and deformed in the direction of the arrow by the action of a compressive force P, thereby expanding the hose-like segment 6 in the direction of the arrow "F" away from the edge of the glass pane, until the desired out-side dimensions of the shaped molding are reached.

The skeleton-like plastically deformable reinforcing insert 10 shown in FIG. 2 is formed from a stamped sheet metal strip with ribs 11 which have been bent round. However, the ribs 11 are not closed into a circle. Rather, the end portions 12 of the ribs 11 are bent away from the direction of the curve of the ribs and serve as a reinforcing insert in the two "U" legs 3 of the shaped molding profile. A shaped molding profile section which is reinforced with such a reinforcing insert exhibits an increased clamping action and the U-shaped section can be fastened or clamped to the glass pane, under certain circumstances, without the application of an adhesive and solely through the clamping action.

A variable profile molding section provided with a reinforcing insert developed according to this principle is shown as the shaped molding section 15 in FIG. 3. It is fastened to the laminated glass pane solely through the clamping action of the U shape legs extending from the hollow profile section 17.

The hollow profile section 17 located outside the central fillet 16 opposite the narrow edge of the laminated glass 2 has on one side a projection 18. A force P may be exerted on the projection 18 with the object of adjusting the size a profile of the framed glass pane. Force P plastically deforms the hollow section segment 17 to the desired degree so that the periphery of the shaped molding takes on the desired dimensions.

In its simplest form, a molding section made according to FIG. 3 can consist of a U-shaped sectional strip of aluminum sheet having a substantially "U" shape in cross section and covered inside and/or outside with a suitable layer of plastics.

Though the shaped molding section 20 shown in FIG. 4 has a cross section with an outside contour similar to that of the shaped molding section 15 illustrated in FIG. 3, but its construction is different in principle, i.e., it is a solid section made of a suitable plastic. At least its central segment 22, which lies outside of the narrow side or edge of the glass pane 21 is made of a thermoplastic material. During the final calibration through plasticizing, the material of the projection 23 is displaced as the result of heating and the action of pressing tools on the projection 23, and thus servies to increase the outer periphery of the shaped molding.

Figure 5:
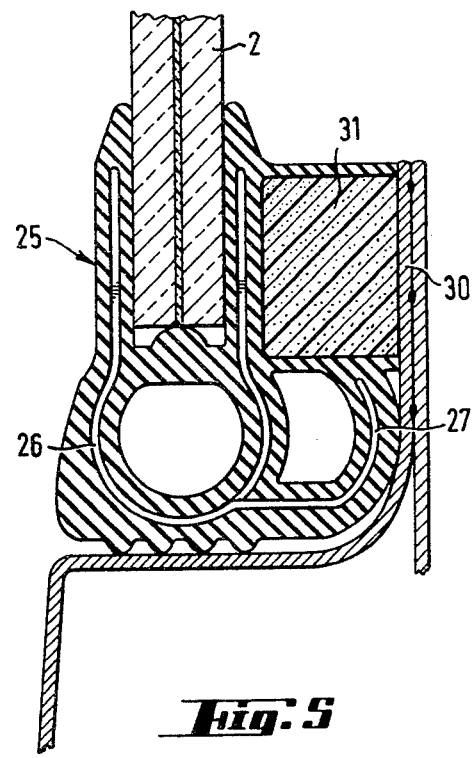
FIG. 5 shows another specific embodiment of the shaped molding according to the invention with a profile segment which can be adapted in two directions.

FIG. 5, in conjunction with FIG. 6, shows a further embodiment in which the shaped molding variable profile section 25 is reinforced with a skeleton-like insert 26 having additional deformable ribs 27 which jut out sidewards and serving as spacers to fix or set the spacing between frame 30 of the window frame and window 2.

A profile segment filled with an adhesive 31 is arranged above the ribs 27 which serve as spacers. This adhesive substance provides the adhesive connection between the shaped molding 25 and the frame 30.

Figure 7:
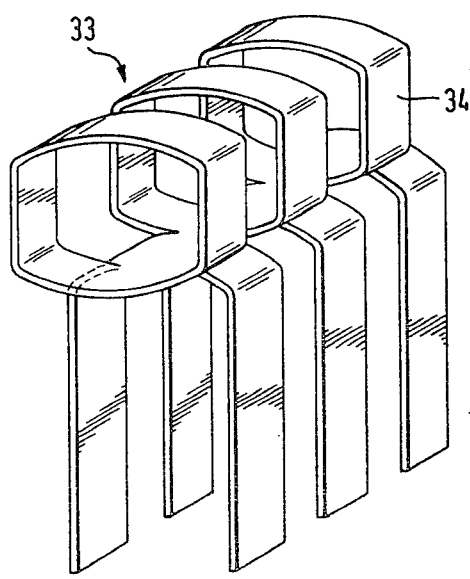
FIG. 7 shows another embodiment of the deformable metallic reinforcing insert for a shaped molding.

The skeleton-like reinforcing insert 33 shown in FIG. 7 has the advantage over the specific embodiments of FIGS. 2 and 6 in that the reinforcing part for the deformable hose-like segment consists of closed rings 34, resulting in greater strength and stability of shape for this portion of the shaped molding.

The manner in which the final calibration of the shaped molding takes place is shown schematically in FIGS. 8 and 9. In the case of the specific embodiment according to FIG. 8, the framed glass pane 2 of the type shown in FIG. 3 is used as an example. As will be recalled, the periphery of the shaped molding 15 is enlarged in a direction in or substantially parallel to the plane of the glass by upsetting the deformable hollow profile segment 17 in a direction at right angles to the plane of the glass pane. For this purpose, the glass pane 2, which is surrounded along its edge by the U shape legs of the molding 15, is laid into a mold 36 which is equipped with a calibrated depression 37 which receives the shaped molding 15. Then, a pressing tool 38 is lowered onto the projection 18 of the shaped molding until the hollow profile segment 17 deforms by expanding in the direction of the plane of the glass and takes on the desired outside dimensions.

Conversely, the shaped molding can be reduced or deformed by subsequent plastic deformation with the system shown in FIG. 9. Advantageously, a shaped molding section 40 is used which has U shape leg sections which surround the glass pane along its edge and which has a hook-shaped profile segment 41 on its outer side away from the legs. At least this hook-shaped profile segment 41 consists of a thermoplastic material. A shaping tool 43 is equipped with a calibrated depression 44 which receives the hook portion and is designed to be heatable. When the glass pane 45, which is surrounded by the shaped molding 40, has been positioned on the support 46, the individual parts of the multi-part forming tool 43 are pressed in a radial direction, i.e., in the direction of the plane on the pane, against the molding section 40 until the outside dimensions of the shaped molding, as determined by the profile segment 41, have been reduced to the desired size.

I claim:

1. A molding for fitting a glass pane fitted to the frame forming a window opening in an automobile body, comprising a variable profile molding (1, 15, 20, 25, 40) adapted to surround the edge of a glass pane, said molding having a deformable segment (6, 17, 22, 41) which, viewed in cross section, lies outside the periphery of the glass pane (2, 21, 45) and a pair of spaced legs and a joining surface forming in cross section a shaped channel within which the outer peripheral edge of the glass pane is received and said segment being asymetrical in cross section and including a deformable reinforcing insert capable of controlled plastic deformation upon the application of a predetermined external force to controllably vary the profile of the molding.

2. The variable profile molding as set forth in claim 1, wherein the plastically deformable segment (6, 17) of the molding consists of a hollow section and at least one hollow deformable body (7, 10, 26, 33) disposed within the hollow section.

3. The variable profile molding as set forth in claim 2, wherein the deformable body includes a metallic strand, O-shaped in section and disposed on the inside surface of the hollow section.

4. The variable profile molding as set forth in claim 2 wherein the deformable body includes a metallic strand, U-shaped in section, embedded in the segment, with a first portion of the U-shaped strand partially surrounding the hollow section and a second portion of the U-shaped strand being embedded in the legs of the molding.

5. The molding as set forth in claim 4 wherein the metallic strand includes a plurality of spaced flexible fingers extending from a base member, said fingers being curved adjacent the base member to form a profile partially circular in cross section and terminating in straight members embedded in the legs of the molding.

6. The molding as set forth in claim 5 wherein the metallic strand includes ribs disposed between the flexible fingers and disposed to jut out at one side to thereby serve as spacers and set the spacing between a window frame for the glass pane and the pane.

7. The molding as set forth in claim 4 wherein the metallic strand includes spaced closed ring sections to one side of a base member and spaced flexible fingers extending outward at the other side of said base member.

8. The molding as set forth in claim 2 wherein the hollow deformable body is disposed entirely within the hollow section.

9. The variable profile molding as set forth in claim 1, wherein the said molding insert includes a metallic skeleton-like slotted sheet metal strip (10, 26, 33) having a plurality of spaced ribs forming a U shaped channel, said channel partially surrounding a hollow section in the molding and said ribs being embedded in the legs of the molding.

10. The variable profile molding as set forth in claim 9, wherein the metallic strip is completely embedded in a flexible material forming the exterior surface of the mold.

11. The molding as set forth in claim 9 wherein the entire metallic strand is embedded in the molding.

12. The variable profile molding as set forth in claim 11, wherein the plastically deformable segment of the molding (20, 40) consists of a thermoplastic material.

13. The molding as set forth in claim 12, wherein the plastically deformable segment of the shaped molding (20), in cross section, is a solid section.

14. The molding as set forth in claim 12, wherein the plastically deformable segment, in cross section, is a fillet constructed and arranged to be shortened by upsetting.

15. The molding as set forth in claim 11 wherein said deformable segment includes a groove adapted to be disposed adjacent an edge of the pane to be received in the molding.

16. The molding as set forth in claim 15 further including an adhesive in said groove.

* * * * *

UNITED STATES PATENT AND TRADEMARK OFFICE
CERTIFICATE OF CORRECTION

PATENT NO. : 4,477,507

DATED : October 16, 1984

INVENTOR(S) : Heinz Kunert

It is certified that error appears in the above-identified patent and that said Letters Patent is hereby corrected as shown below:

In the Abstract, line 1, delete "A shaped molding (13) ..."
and insert -- A shaped molding (15) ... --;

Claim 12, line 15, delete "Claim 11"
and insert -- Claim 1 --;

Claim 15, line 24, delete "Claim 11"
and insert -- Claim 1 --.

Signed and Sealed this

Ninth Day of July 1985

[SEAL]

Attest:

DONALD J. QUIGG

Attesting Officer — Acting Commissioner of Patents and Trademarks